UNITED STATES PATENT OFFICE.

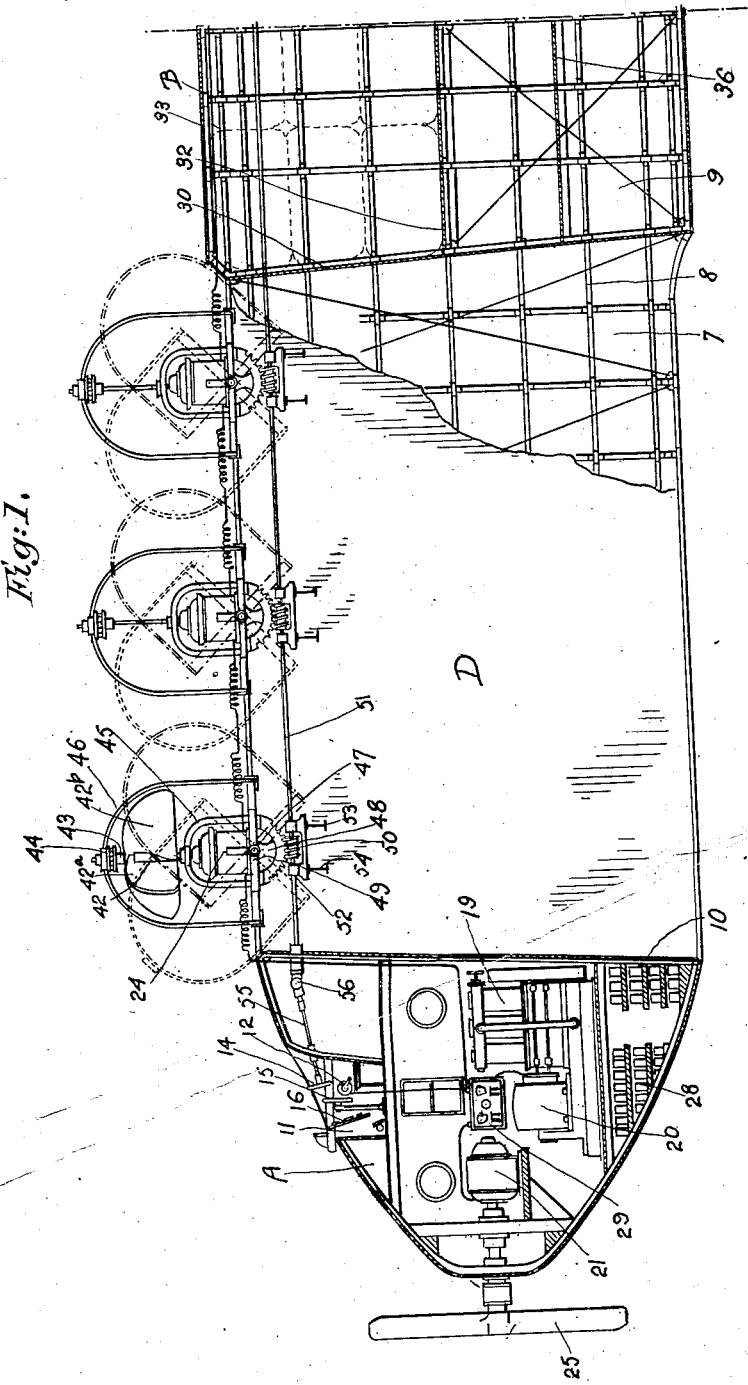

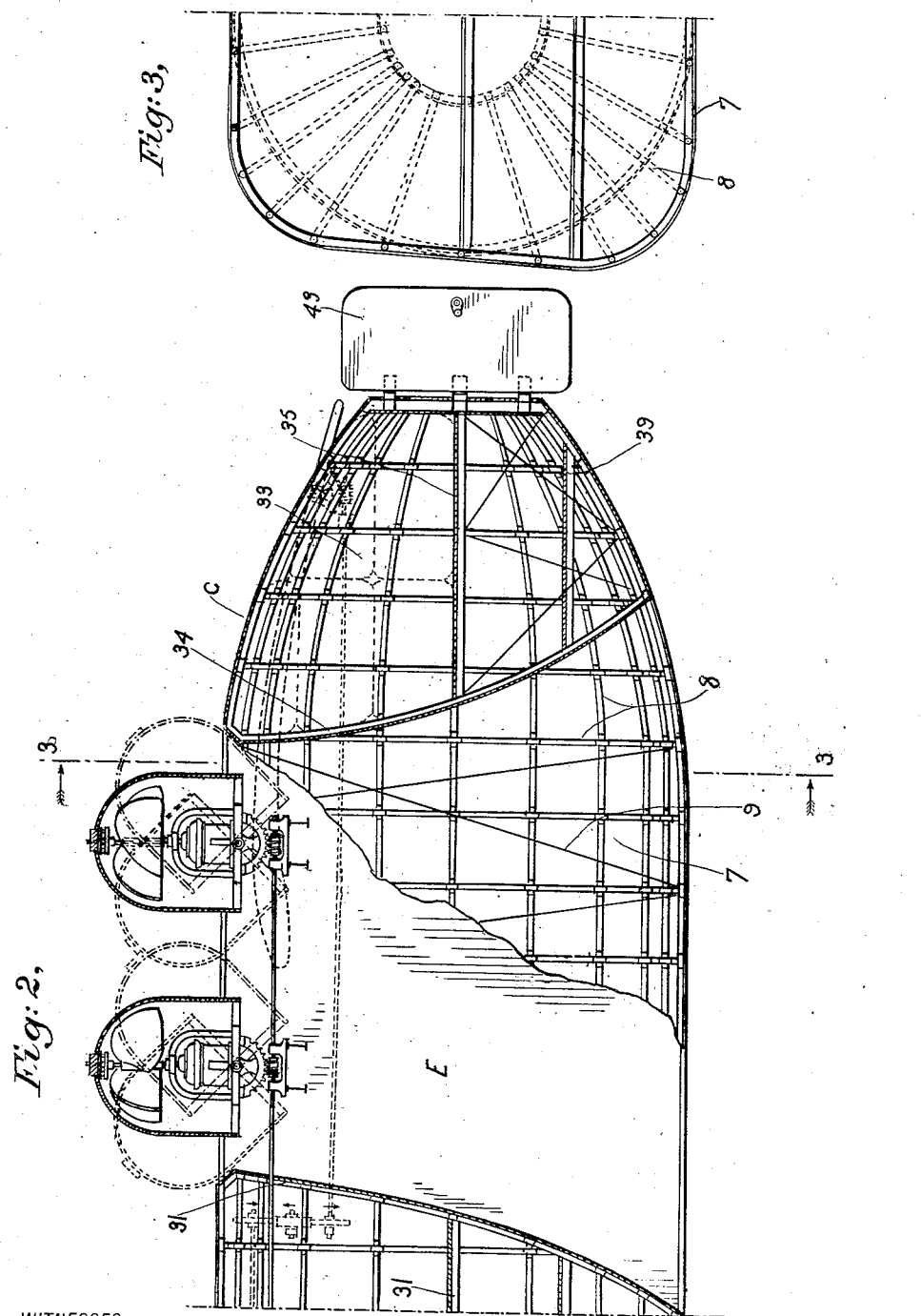

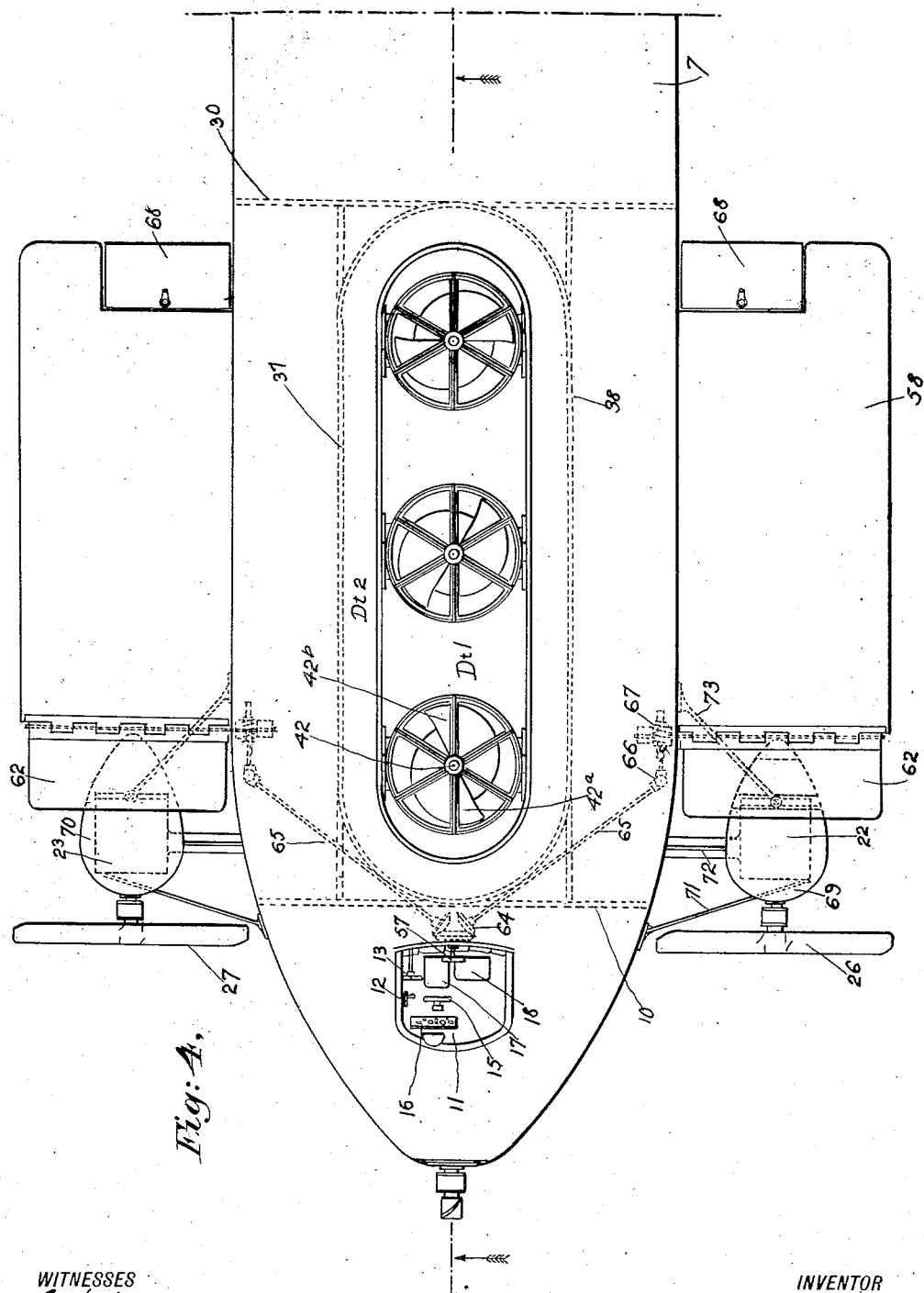

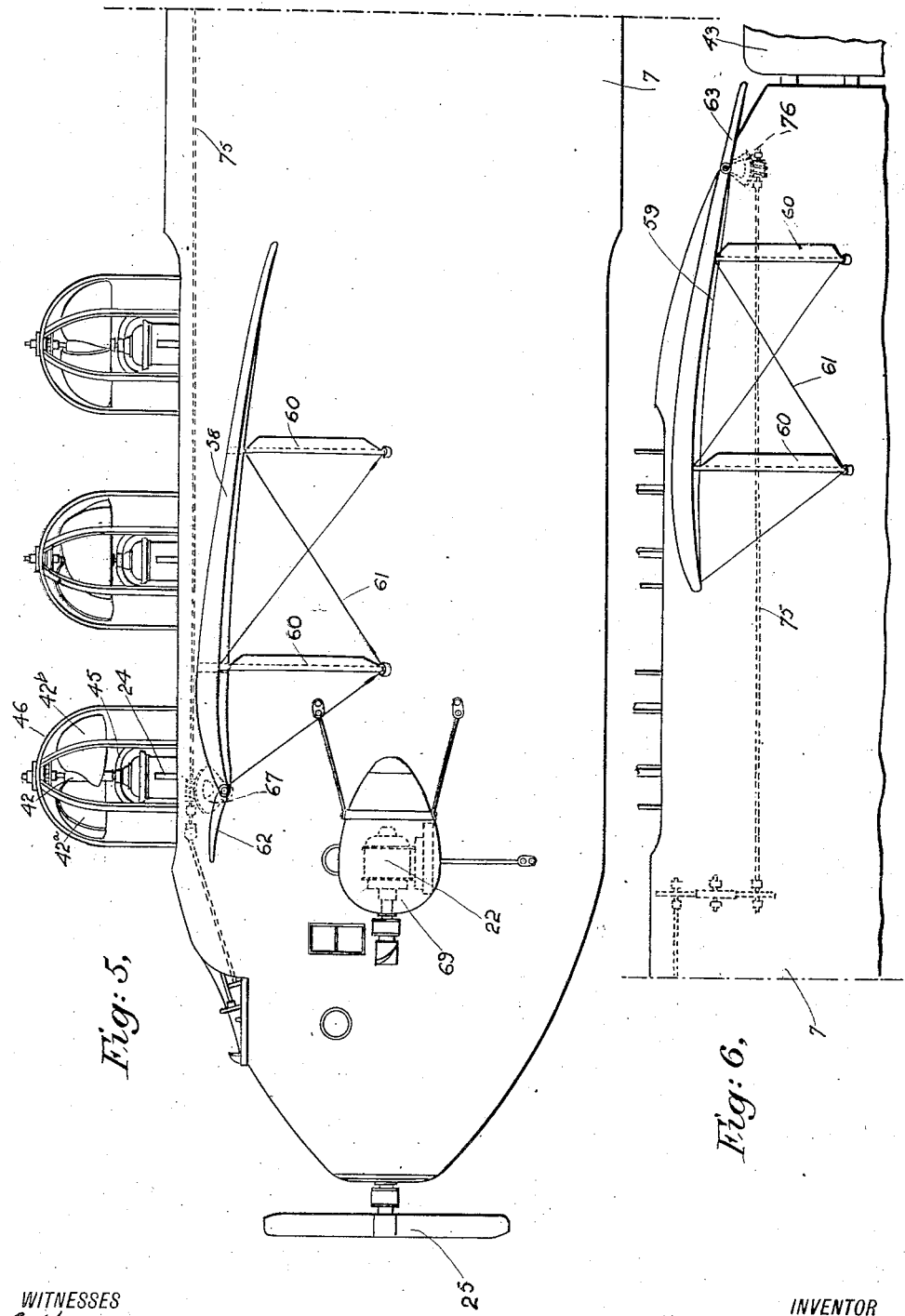

JAMES WHALEN, OF CHICAGO, ILLINOIS.

AIRCRAFT.

1,332,787.                Specification of Letters Patent.      Patented Mar. 2, 1920.

Application filed March 1, 1919. Serial No. 279,987.

*To all whom it may concern:*

Be it known that I, JAMES WHALEN, a citizen of the United States, and a resident of Chicago, in the county of Cook and State of Illinois, have invented new and useful Improvements in Aircraft, of which the following is a full, clear and exact description.

My invention relates to an aircraft capable of use either as an airboat or air-land machine, and resides more especially in a propeller embodying the helicopter principle, and the combination and arrangement of said propeller with the instrumentalities for effecting sustentation, stability and propulsion employed in the dirigible and aeroplane.

One of the objects of my invention is to provide an aircraft of reliable stability and large weight-carrying capacity.

Another object of my invention is to provide an aircraft sustained, stabilized and propelled by the joint action of the forces produced by instrumentalities separately employed therefor in the lighter-than-air and heavier-than-air types of machines.

A further object of my invention is to successfully apply the helicopter principle to an aircraft of the type described.

A still further object of my invention is to provide a craft of the direct-lift type, which may ascend and descend without first traveling along the ground or water.

Before proceeding to a more detailed explanation of the drawings it should be understood that while the aircraft as shown and described is the preferred embodiment of my invention I do not desire to be limited to the particular application thereof, design, or arrangement of parts illustrated.

Reference is to be had to the accompanying drawings, in which similar characters of reference indicate corresponding parts throughout, and in which—

Figures 1 and 2 give a side view in elevation of the entire aircraft, with sections of the frame and envelop cut away to expose the interior construction of the body;

Fig. 3 is a cross-sectional view of half of the body, taken along the line 3—3, and looking in the direction indicated by the arrows, 3—3 of Fig. 2;

Fig. 4 is a plan view of the forward part of the aircraft;

Fig. 5 is a side view in elevation of the forward part of the ship, exhibiting the arrangement of forward wings and propellers; and Fig. 6 is a fragmentary view of the aft portion of the exterior of the ship, showing the location of the rear wing.

The body or fuselage 7 (Figs. 1 and 2), is elongated in form, with rounded and pointed ends and a middle portion having flattened sides and upper and lower bases, the lower base being slightly larger than the upper base, (Fig. 3), to lend stability to the craft, when in the water. The frame 8 of the body 7 is a rigid structure made preferably of a latticed aluminum tubing braced by guy wires 9, and it is covered with an envelop of suitable material.

The body or fuselage 7 is divided up into various chambers or bulkheads for the purpose of providing spaces for the necessary machinery, pilot house, gas bags, passenger accommodations, and storage. Bulkhead A, inclosed within the partition 10, contains in the upper part thereof, the pilot house 11 and its equipment, consisting of manual controls 12, 13, 14, 15 and 57, instrument boards 16, pilot's seat 17, and observer's seat 18. In the lower part of the compartment 8 is installed a gasolene engine 19 employed to drive electric generator 20, which, together with storage battery 28, furnishes current through switch box 29 to synchronized motors 21, 22 and 23, driving three front propellers of the tractor type, designated respectively, as 25, 26 and 27, and five synchronized motors, like motor 24, driving respectively, a series of the same number of vertically-acting propellers, such as propeller 42. Compartment B, situated in the middle portion of the body 7, contained within partitions 30 (Fig. 1), and 31 (Fig. 2), and flooring 32, is filled with gas bags 33, as is also compartment C in the after end of the craft inclosed within partition 34 and flooring 35. The spaces provided between floors 32 and 36 in the middle portion of the ship, and on both sides of three vertically-acting propellers in the forward part of the ship, embraced within partitions 10, 30 and 37 on the one side, and 10, 30 and 38 on the opposite side, may be used for passenger accommodations, including staterooms and the like (Fig. 4). Rooms included within partitions 34 and floors 35 and 39 in the after end of the craft may be used for storage or other purposes.

Running vertically through the center of the body 7, from top to bottom, and situated fore and aft, and directly underneath the vertically-acting propellers 42, etc., I provide open air spaces D and E (Figs. 1 and 2), tapering from the top opening D, $t_1$, to the somewhat larger, bottom opening D, $t_2$. Set in the top opening of air spaces D, I have shown a series of three vertically-acting, direct-lift propellers, and in the top opening of the air spaces E, two such propellers, the shafts of each of which lie in a vertical plane passing through the center of the body or fuselage 7. The propeller shafts are connected respectively, to motors supplied with current from generator 20 or storage battery 28. The said propellers or motors are contained in turreted frames supported on girders spanning said openings, and are axially mounted in the said top openings D and E in such manner that they may be deflected forward or backward from the vertical position, by turning control 14.

Detailed description of the construction of one of the vertically-acting direct-lift propeller-motor units, and deflection and control mechanism therefor, will suffice for all, as each of said units is similar in every respect. Taking, therefore, the first propeller of the motor units of the set acting through open air space D, the propeller 42 is composed, in my preferred design, of two relatively deep gull-wing blades $42^a$ and $42^b$, adapted and adjusted to thrust air downwardly through air spaces D. The axis 43 of the propeller 42 turns in ball-bearings 44 at its upper end, and is connected to a motor 24 supported in frame 45 at its lower end. The propeller 42, motor 24, axis 43, are contained in a turreted frame 46 which is axially mounted in the top opening of the air space D, on shaft 47, supported by girder 48. Depending from the bottom horizontal portion of frame 46, is a toothed arc 49, which is in engagement with a worm 50 fixed on the control shaft 51. Control shaft 51 is supported at intervals by brackets 52, in turn set on I-beams 52 and 54, and is connected to the manual control rod 55, by means of universal joint 56. When the manual control 14 is turned it is evident that the turreted frames carrying the various propellers and their motors will be deflected forward or backward as desired.

Situated at the forward and after ends of the ship, on either side thereof, are wing surfaces 58 and 59 braced by struts 60 and guy wires 61. Hinged on the front ends of the forward set of wings are elevators 62, and on the rear end of the set of wing surfaces situated at the after end of the ship, elevators 63. Both forward and aft elevators 62 and 63, on both sides of the ship, are controlled by manual control 57 operating through bevel gears 64, shafts 65, universal joint 66, and worm and toothed arc 67, in the forward part of the craft, and shaft 75 and worm and toothed arc 76 in the after part. Attached to the rear end and forward wing surfaces are ailerons 68.

The aircraft is provided with three forward propellers of the tractor type, 25, 26 and 27, propellers 26 and 27 being placed at the sides and driven by motors 22 and 23 supported in housings 69 and 70, the housings being supported by brackets 71, 72 and 73. The craft is provided with a rudder 74, the means for controlling which are not shown, as they comprise any suitable mechanism in common use.

At the beginning of flight as soon as the vertically acting propellers 42, etc., are started and attain a sufficient speed, they will cause the aircraft to ascend directly without first traveling some distance along the ground or water. The buoyant force exerted by the said vertically-acting propellers, is augmented by that furnished by the gas bags 33, which forces coöperate to lift and sustain the aircraft. When the aircraft has ascended far enough to clear all obstructions, propellers 25, 26 and 27 are started, the aircraft is propelled forward on its course, and the wing surfaces 58 and 59, located rearwardly of the said propellers, coact therewith to produce a buoyant force which increases in magnitude as the craft gains in speed, with the result that the vertically-acting propellers are gradually relieved of the portion of the load carried by them. As soon as the craft gets under way on its course, the vertically-acting propellers 42, etc., are deflected forward against the wind in which position, they will produce a maximum force having both a lifting and a driving component, thus augmenting the driving force produced by the forward driving propellers, and in descending said propellers are adjusted perpendicularly or deflected rearwardly, in which positions their effect is to allow the craft to make a landing without an after horizontal motion similarly to the action described in making the ascent.

I position, wing surfaces 58 and 59, gas bags 33, as well as vertically acting direct lift propellers 42, etc., so that the buoyancy forces produced by these instrumentalities are all applied and communicated to parts of the body lying above a horizontal plane through the center of gravity thereof, by which arrangement I secure a maximum of stability for the aircraft.

The aircraft described in the foregoing may be used as an airboat, an aero-hydro craft, or as an airship, the latter use requiring the addition of wheels and skid not shown.

Having thus described my invention, I claim as new and desire to secure by Letters Patent:

1. In an aircraft of the type described, in combination, a body, an open air passage extending transversely therethrough from top to bottom and an instrumentality coöperating with said passage to produce a downwardly directed thrust of air through said passage, said instrumentality comprising a plurality of propeller motor sets, each supported in a frame, manually operated means for deflecting said frames forward and backward about horizontal axes, said motors being adapted to run at the same speed and to be supplied with current from a central source of supply.

2. In an aircraft of the type described, in combination, a body, an open air passage extending centrally and transversely therethrough from top to bottom, and an instrumentality coöperating with said passage, to produce a downwardly directed thrust of air through said passage, said instrumentality comprising a plurality of propeller motor sets, each supported in a frame, manually operated means for deflecting said frames forward and backward about horizontal axes, said motors being adapted to run at the same speed and to be supplied with current from a central source of supply.

3. In an aircraft of the type described, in combination, a body, an open air passage extending centrally and transversely therethrough from top to bottom, and an instrumentality coöperating with said passage, to produce a downwardly directed thrust of air through said passage, said instrumentality comprising a plurality of propeller motor sets, each supported in a frame, manually operated means for controlling said motors, means for simultaneously deflecting said frames forward and backward about horizontal axes, said motors being adapted to run at the same speed and to be supplied with current from a central source of supply.

4. In an aircraft of the type described, in combination, a body, an open air passage extending centrally and vertically therethrough from top to bottom, a propeller supported in a frame and situated across the top of said open air passage, means for driving said propeller, and manually operated means for deflecting said frame forward and backward about a horizontal axis, wing surfaces attached to said body, propellers co-acting therewith, and means for driving and controlling said propellers, a compartment in said body for holding gas bags, and means for steering and elevating said aircraft.

5. In an aircraft of the type described, in combination, a body, an open air passage extending centrally and vertically therethrough from top to bottom; a plurality of propellers each connected to a motor and comprising separate sets supported in frames and mounted in the top opening of said open air passage, means for driving and controlling said motors, and means manually controlled for deflecting said frames forward and backward, wing surfaces attached to said body, propellers co-acting therewith, and means for driving and controlling said propellers, a compartment in said body for holding gas bags, and means for steering and elevating said aircraft.

6. In an aircraft of the type described, in combination, a body, an open air passage extending centrally and vertically therethrough from top to bottom; a plurality of propellers each connected to a motor and comprising separate sets supported in frames and mounted in the top opening of said open air passage, means for driving and controlling said motors, and means manually controlled for deflecting said frames forward and backward, wing surfaces attached to both sides of said body, fore and aft, above a horizontal plane through the center of gravity of said body, and a compartment for gas bags situated above said plane, propellers of the tractor type co-acting with said wing surfaces, and means consisting of elevators, ailerons and a rudder for steering said aircraft horizontally and vertically.

JAMES WHALEN.